United States Patent [19]

Braeger

[11] Patent Number: 5,021,023
[45] Date of Patent: Jun. 4, 1991

[54] APPARATUS FOR THE SKINNING OF FISH

[75] Inventor: Horst Braeger, Lübeck, Fed. Rep. of Germany

[73] Assignee: Nordischer Maschinenbau Rud. Baader GmbH & Co. KG, Lubeck, Fed. Rep. of Germany

[21] Appl. No.: 501,887

[22] Filed: Mar. 30, 1990

[30] Foreign Application Priority Data

Apr. 5, 1989 [DE] Fed. Rep. of Germany ....... 3910984

[51] Int. Cl.$^5$ ............................................. A22C 25/17
[52] U.S. Cl. ..................................................... 452/127
[58] Field of Search .................... 452/125, 127, 130

[56] References Cited

U.S. PATENT DOCUMENTS

| | | | |
|---|---|---|---|
| 4,222,152 | 9/1980 | Braeger | 452/127 |
| 4,340,995 | 7/1982 | Braeger | 452/127 |
| 4,730,368 | 3/1988 | Townsend | 452/127 |

FOREIGN PATENT DOCUMENTS 2653946 9/1977 Fed. Rep. of Germany .
2844241 6/1979 Fed. Rep. of Germany .

*Primary Examiner*—Willis Little
*Attorney, Agent, or Firm*—Fay, Sharpe, Beall, Fagan, Minnich & McKee

[57] ABSTRACT

In a skinning apparatus comprising a skinning roller, a presser face opposing and at a slight distance from said roller's circumferential surface, and a skinning knife associated with said presser face, the circumferential surface of the skinning roller includes a plurality of grooves extending essentially parallel to the axis of rotation and defining a roller surface which is limited to the ridge faces of the tooth webs separating two neighboring grooves, the grooves being designed generally flat and with relatively large pitch and having a cross-section, whose depth amounts to a maximum of 0.5 mm in the region of the leading flanks of the tooth webs and exceeds this in the region of the trailing flanks.

20 Claims, 1 Drawing Sheet

APPARATUS FOR THE SKINNING OF FISH

BACKGROUND OF THE INVENTION

1. Field of the Invention

The invention relates to an apparatus for the removal of the skin of fillets of fish.

In the skinning of fish fillets on skinning machines of the construction principle in which a skinning roller driven to rotate is used, such roller normally includes a plurality of grooves extending parallel to the axis of rotation and defining a roller surface which is limited to the ridge faces of the webs separating two neighbouring grooves. In this type of skinning machine there is further made use of a presser face opposing said roller's circumferential surface, and of a skinning knife associated with said presser face. In such skinning apparatus structure it is important, on the one hand, to achieve a precise incision, i.e. to ensure that the skin of the fillet runs in between the skinning roller and the presser face and, on the other hand, to achieve that the skinning is accomplished with the least possible loss of fillet meat. The expert is able to recognise to what extent the latter requirement can be fulfilled on the basis of the quality of the so-called silver mirror which constitutes the layer between the meat and skin in the majority of the bulk fish types. Simultaneously, the flawless presence of this feature gives the fillet an appealing exterior, which is the reason that it is considered indicative of quality by the consumer.

As practice demonstrates, the coordination of these requirements is problematic because the appropriate steps for optimising the individual requirements, in accordance with current knowledge, runs counter to the respective remaining requirements.

2. Related Art

A typical piece of prior art for this kind of apparatus is represented through the disclosure of DE-AS 26 53 946, which shows a skinning apparatus of the type described above. The skinning roller, according to this concept, is provided with grooves on its circumferential surface which have, remaining between them, a tooth web which resembles saw teeth in cross-section. The grooves have a cross-section which is designed to enable the leading tip or end of the fillet to be skinned to arrive under the skinning knife and underneath the presser face.

In such an arrangement, to be observed is that the incision accuracy increases with greater tooth separation. The silver mirror, however, is simultaneously destroyed or lost.

Thus, another machine concept to be taken from DE PS 28 44 241 originated, in which a skinning roller is used which has a circumferential surface, the latter having simply been roughened and being interrupted by single grooves. These have, in an example, a width of 5 mm and a depth of 1.5 mm. Consequently, they are relatively flat and guarantee a precise incision. Although with a skinning roller of such design the desired silver mirror on the fillet is obtained in the regions between the grooves, it is reduced in the region of the grooves, according to the quality and kind of fish being processed, such that the position of the grooves can be recognised on the skinned fillet.

OBJECTS OF THE INVENTION

It is the principal object of the invention to overcome the drawbacks of the prior art structures and to suggest a skinning apparatus safeguarding the production of a high quality fillet product.

It is thus a further major object of the invention to suggest an apparatus enabling a problem-free incision.

It is, simultaneously, another essential object of the invention that such apparatus makes it possible to obtain an homogeneous silver mirror.

SUMMARY OF THE INVENTION

In a skinning apparatus comprising a skinning roller driven to rotate, provided with a plurality of grooves which extend essentially parallel to the axis of said skinning roller, and defining a cylindrical circumferential surface being limited to ridge faces defined by a plurality of tooth webs, according to the present invention, these objects are achieved with a skinning roller which is characterised in that the depth of each groove in the region of the leading flank of the tooth web, when viewed in the direction of movement, is smaller than in the region of the trailing flank of the same, that the size ratio between the width of the grooves measured on the circumferential surface and the greatest depth of said grooves is equal to or greater than 3:1, that the size ratio between the width of said ridge face of the tooth webs and the minimum dimension of the depth of the grooves does not exceed 2:1 and that the smallest dimension of the depth of the grooves does not fall below 0.5 mm.

The advantages thus to be obtained consist particularly in that the groove base is used, at least in part, for the supporting of the skin. Due to this partial supporting, also in the groove region, a virtual reduction of the available engagement length of the skin above the unusually wide grooves is produced with the effect that the possibility and danger of the skin portion located there during the skinning process being displaced is reduced. Simultaneously, due to the greater groove depth in the region of the trailing flank of the tooth web, a receiving volume is made available to the arriving fillet end which ensures incision.

For the purposes of advantageously solving the basic problems of the invention as well as of improved cleaning abilities, expedient embodiments can be applied with particular regard to the angular arrangements and detailed design of the tooth webs, grooves, flanks and ridge faces. With special regard to the feature of the formation of the base surface of the grooves by an elastic material it should be noted that a skinning roller of such design is not dependent upon fish type or size, i.e. that it can, to a great extent, be used and applied universally.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

DETAILED DESCRIPTION OF THE PREFERRED EMBODIMENTS

Figure 1:
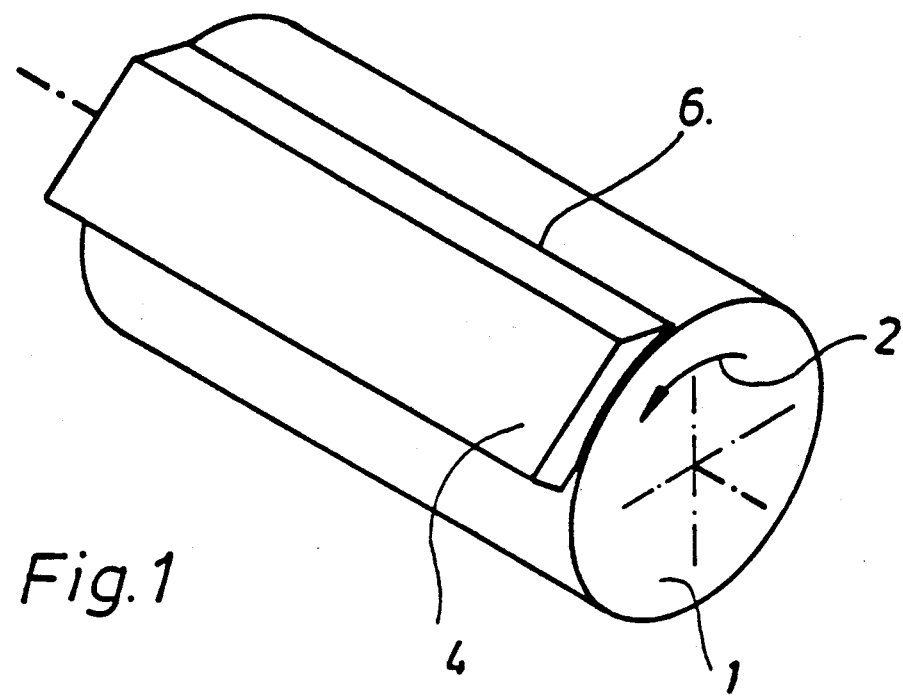
FIG. 1 shows a section from a skinning apparatus according to the invention, illustrated in a simplified manner by way of an axonometric view.

A skinning roller 1 is mounted in a not-shown frame of a skinning device and driven to rotate in an appropriate manner according to arrow 2 indicating the direction of rotation. A presser face 5 is arranged to oppose a cylindrical circumferential surface 3 of the skinning roller 1 at a slight distance therefrom. This presser face 5 is associated with a presser pad 4 having one edge positioned against the direction of rotation, which edge is formed as a cutting edge 6.

Figure 2:
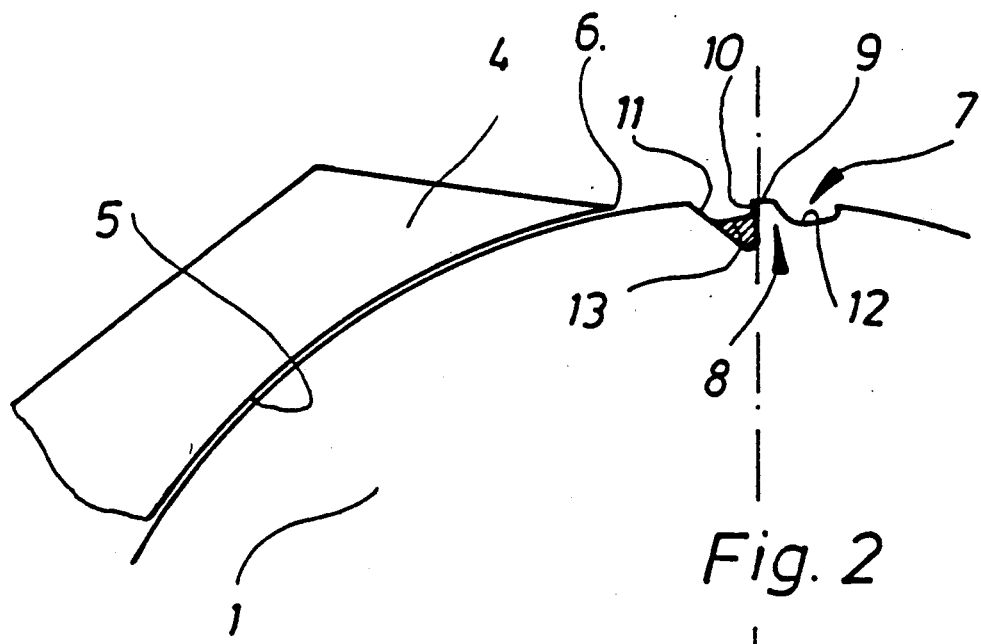
FIG. 2 shows a cross-section through the apparatus corresponding to FIG. 1 on an enlarged scale

The circumferential surface 3 of the skinning roller 1 is provided with grooves 7 extending along the generatrixes of said surface, each two neighbouring grooves being separated by a tooth web 8 whose ridge face 9 is a component of the circumferential surface. In such arrangement, the leading flanks 10, together with the associated ridge face 9, form an angle of less than 90° and the trailing flanks 11 form such an angle of more than 90°. Each groove 7 has a base area 12, which is inclined against the direction of rotation of the skinning roller 1. According to FIG. 2, the base area can be formed through partial filling in of grooves designed with greater depth with an elastic material 13, e.g. silicon rubber.

The function of the described skinning device is as follows:

A fish fillet lying on the skin side and guided over a supplying conveyor belt or slide (not shown) onto the circumferential surface of the skinning roller 1, is brought into the region of the cutting edge 6 following to the roller's peripheral speed being higher than the conveying speed due to dynamic frictional engagement between the skinning roller 1 and the fillet, on the one hand, and partly as a result of the pushing force of the conveying mechanism. Through the effect of gravity and by means of the reduced pressure effective on the boundary surfaces between the skinning roller 1 and the fillet, which pressure is generated based on the differential speed according to the wing lifting principle, the leading fillet tip or end is positioned in the grooves 7 such that the skin parts arrive under the circumferential surface of the roller. Consequently, the cutting edge 6 arranged at a slight distance above the circumferential surface is then in a position to penetrate into the fillet between the skin and the flesh. Hereby, it is simultaneously ensured that a clamping of the skin can occur with regard to the presser face 5 of the presser pad 4 directly following the cutting edge 6 thus allowing further conveyance. This occurs positively and is, therefore, very safe and accurate, because in such arrangement, the tooth webs 8 can press into the deformable skin with their ridge faces 9 such that the skin parts displaced in this manner flow into the adjacent grooves 7. This process leads to a local "thickening" of the skin in the areas following the ridge face 9 and results in that the skin is unable to support itself, at least in the flatter regions of the groove cross section, with regard to the base area 12 of the grooves 7. Thus, the available free engagement length of the skin over the grooves 7 is reduced, and the possibility of displacement or escaping of said skin, caused by the wedge forces of the cutting edge 6 in conventional apparatus, is substantially reduced. The effect is, that the cutting edge 6 can move in a predominantly uniform layer between skin and meat, such that it is possible to accomplish the severing of the skin between the skin and the silver mirror following corresponding blade adjustment.

This procedure can be executed, practically regardless of the thickness of the skin and of modifications depending on the type of fish, if the base area 12 of the grooves 7 is designed by partial filling in of grooves which have been shaped to greater depth, with a suitable elastomer, so that sufficient space for overthick skin or skin parts, respectively, can be provided in the grooves through corresponding deformation of this filling.

What is claimed is:

1. An apparatus for removing the skin from fish fillets, said apparatus comprising
   (a) a skinning roller driven to rotate in a predetermined rotational direction about an axis of rotation, provided with a plurality of grooves which extend essentially parallel to said axis and define a groove base area and having a cylindrical circumferential surface limited to ridge faces defined by a plurality of tooth webs formed between adjacent ones of said grooves, respectively, each of which webs defines a leading and a trailing flank, respectively, with regard to said rotational direction;
   (b) a presser face opposing said circumferential surface of said skinning roller, and
   (c) a skinning knife associated with and designed to correspond to said presser face, wherein
   (d) the depth of each groove in the region of said leading flank of said tooth web, when viewed in said direction of movement, is smaller than in the region of said trailing flank of said web;
   (e) the size ratio between the width of the grooves measured on said circumferential surface and the greatest depth of said grooves is equal to or greater than 3:1;
   (f) the size ratio between the width of said ridge face of said tooth webs and the minimum dimension of the depth of said grooves does not exceed 2:1; and
   (g) the smallest dimension of the depth of the grooves does not fall below 0.5 mm.

2. An apparatus as claimed in claim 1, wherein said leading flank of said tooth webs and the associated one of said ridge faces include an angle of smaller than 90°.

3. An apparatus as claimed in claim 1, wherein said base area of each of said grooves includes an angle of substantially 90° with said leading flank of the corresponding of one of said tooth webs.

4. An apparatus as claimed in claim 2, wherein said base area of each of said grooves includes an angle of substantially 90° with said leading flank of the corresponding of one of said tooth webs.

5. An apparatus as claimed in claim 1, wherein said trailing flank of said tooth webs includes an angle of more than 90° with the associated one of said ridge faces.

6. An apparatus as claimed in claim 2, wherein said trailing flank of said tooth webs includes an angle of more than 90° with the associated one of said ridge faces.

7. An apparatus as claimed in claim 3, wherein said trailing flank of said tooth webs includes an angle of more than 90° with the associated one of said ridge faces.

8. An apparatus as claimed in claim 4, wherein said trailing flank of said tooth webs includes an angle of more than 90° with the associated one of said ridge faces.

9. An apparatus as claimed in claim 1, wherein transitional areas between said flanks delineating said grooves and said base areas of said grooves are formed by radii.

10. An apparatus as claimed in claim 2, wherein transitional areas between said flanks delineating said grooves and said base areas of said grooves are formed by radii.

11. An apparatus as claimed in claim 3, wherein transitional areas between said flanks delineating said grooves and said base areas of said grooves are formed by radii.

12. An apparatus as claimed in claim 4, wherein the transitional areas between said flanks delineating said groove and said base area of said groove are formed by radii.

13. An apparatus as claimed in claim 5, wherein the transitional areas between said flanks delineating said groove and said base area of said groove are formed by radii.

14. An apparatus as claimed in claim 8, wherein the transitional areas between said flanks delineating said groove and said base area of said groove are formed by radii.

15. An apparatus as claimed in claim 2, wherein said base area of said grooves is formed by an elastic material.

16. An apparatus as claimed in claim 3, wherein said base area of said grooves is formed by an elastic material.

17. An apparatus as claimed in claim 4, wherein said base area of said grooves is formed by an elastic material.

18. An apparatus as claimed in claim 5, wherein said base area of said grooves is formed by an elastic material.

19. An apparatus as claimed in claim 9, wherein said base area of said grooves is formed by an elastic material.

20. An apparatus as claimed in claim 14, wherein said base area of said grooves is formed by an elastic material.

* * * * *